(Model.)
M. P. BOGERT.
COMBINING CELLULOID, &c., WITH WOVEN OR KNITTED FABRIC, &c.
No. 270,538. Patented Jan. 9, 1883.
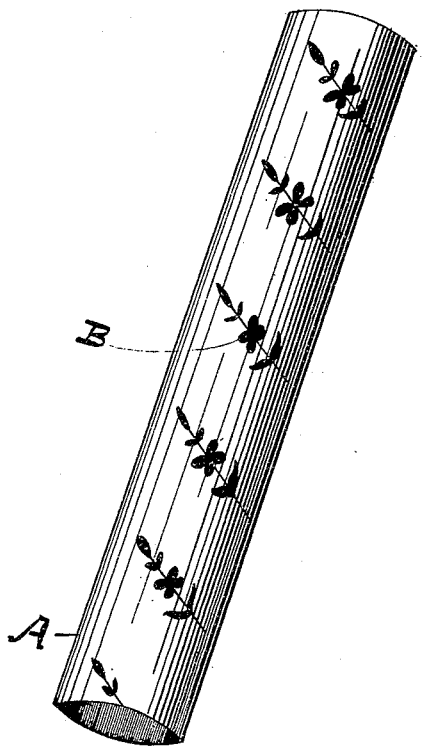
Attest:
Charles H. Pell
Chas. T. Winters
Inventor:—
Mortimer P. Bogert,
by
O. Drake, Atty.

UNITED STATES PATENT OFFICE.

MORTIMER P. BOGERT, OF NEWARK, NEW JERSEY, ASSIGNOR TO JOHN B. OELKERS, OF SAME PLACE.

COMBINING CELLULOID, &c., WITH WOVEN OR KNITTED FABRIC, &c.

SPECIFICATION forming part of Letters Patent No. 270,538, dated January 9, 1883.

Application filed February 14, 1882. (Model.)

*To all whom it may concern:*

Be it known that I, MORTIMER P. BOGERT, a resident of Newark, in the county of Essex and State of New Jersey, have invented certain new and useful Improvements in Combining Celluloid and other Plastic Materials with Woven or Knitted Fabrics, and of Using the Same; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

In the drawing, A represents a cylinder of celluloid or similar material, and B pieces of celluloid combined with fabric in the manner hereinafter described, which pieces have been inlaid in the cylinder by the application of heat and pressure.

The object of this invention is to secure new and useful results in the uniting of celluloid, lignoid, or other pyroxyline or plastic materials, either separately or compounded, with linen or other woven, knitted, or felted fabrics, one important result being, when two or more pieces of celluloid or other pyroxyline or plastic materials of contrasting colors are united, the preventing of the different colors from flowing or blending together, as heretofore has been the case, whereby a great variety of the most beautiful as well as otherwise useful effects can be produced, as will be hereinafter more fully set forth.

The invention consists in the peculiar method of uniting the celluloid, or other pyroxyline or plastic materials, or compounds of the same, with linen or other fabric, and also of subsequently uniting the fabric so saturated or coated with the said plastic or semi-plastic materials, and of its application to the various and multifarious articles of manufacture, all as will be hereinafter described, and finally embodied in the claims.

In carrying my invention into effect the woven, knitted, or felted fabric is submerged into or saturated with a solution, preferably cold, of alcohol and camphor or dissolved celluloid, lignoid, or other pyroxyline or plastic materials, or compounds of the same, then subjecting the fabric thus coated or saturated to a slight pressure between heated plates or rolls, heated to, say, 212° Fahrenheit or less, and then letting it cool off. The fabric thus treated, when dry and removed from between said plates, is ready to be applied to the various articles of manufacture—such as collars, cuffs, and a great variety of other articles which it is unnecessary here to mention. The process so far, however, leaves the fabric or material of a uniform color, which may be red, white, or any other color that may be given to the bath; and in order to impart a variety of colors to the surface of the fabric, the latter, after being submerged in or saturated with the solution, as above stated, before being placed between heated plates, and while still moist, is sprinkled or otherwise covered, or partially so, with celluloid or other pyroxyline or plastic materials in the form of a sheet, or in small pieces, strips, dust, granulated particles, or cuttings of any form or variety of forms, of one or of various colors, and on one or both sides thereof, the moisture being sufficient to cause the particles to adhere to the surface of the fabric, which latter is then subjected to pressure between heated plates or rolls, as already described, which inlays or embeds the particles so applied into the fabric, making the surface thereof perfectly smooth and compact, and when cooled and removed from the plates, &c., the fabric is ready for use, presenting a surface of a mottled or speckled appearance, each color, however, being clearly defined and distinct, said colors, as a result of the process, being prevented from flowing into each other and presenting a cloudy appearance, as heretofore, yet all being firmly welded or cemented together. In this form or condition the fabric or material is designed to and may be applied in the usual way by any of the well-known methods to the various articles of manufacture for which it is adapted. It may also be stamped or cut up into flowers, leaves, and a vast variety of fancy forms, and inlaid in celluloid or other pyroxyline or plastic materials prepared by any of the well-known methods, or in the fabric prepared by the process herein described, or in wood, horn, bone, rubber, or other plastic or semi-plastic material, by laying the pieces so stamped or cut out upon the articles to be inlaid in the forms desired, (one form being indicated in the drawing,) and then submitting the same to pressure between heated plates, rolls, or dies, as hereinbefore described, or by any other suitable or appropriate methods; or the figures or pieces may be laid upon the surfaces of any of the various articles, and cemented thereon by the use of any suitable cement, the figures being thus shown in relief, as will be readily understood.

The materials treated as herein described are admirably adapted to be used in the manufacture of pencil-cases, card-cases, jewelry, watch, and toilet cases, pocket-books, combs, brushes, parasol, umbrella, and other handles, card-receivers, book and album covers, &c., and the ornamentation of the same.

The drawing represents a perspective view (enlarged) of a pencil-case ornamented according to my improved process.

I am aware that celluloid, pyroxyline, and similar plastic substances have been heretofore applied to various materials to render them water-proof, and also had designs printed thereon in colors after such application. I therefore do not claim such application and printing, broadly.

What I claim, and desire to secure by Letters Patent, is—

1. The herein described process of coating fabric with celluloid, pyroxyline, or analogous material with a variety of distinct colors at one operation, which consists in applying to material coated with the plastic substance variously-colored pieces, shavings, or particles of the same substance, and then by heat and pressure incorporating the same therewith, substantially as described.

2. As an article of manufacture, the herein-described fabric, coated with celluloid, pyroxyline, or similar plastic material of any desired color or colors, adapted to be by heat and pressure forced into and inlaid in like plastic or semi-plastic material without mixing of the colors or changing shape, substantially as described.

In testimony that I claim the foregoing I have hereunto set my hand this 6th day of February, 1882.

MORTIMER P. BOGERT.

Witnesses:
OLIVER DRAKE,
CHAS. T. WINTERS.